United States Patent Office 3,305,572
Patented Feb. 21, 1967

3,305,572
BRANCHED CYCLIC SILOXANES AND
PROCESS THEREFOR
George M. Omietanski, Tonawanda, N.Y., assignor to
Union Carbide Corporation, a corporation of New
York
No Drawing. Filed Apr. 29, 1963, Ser. No. 276,171
6 Claims. (Cl. 260—448.2)

This invention relates to branched cyclic polysiloxanes of specific desired compositions and to a process for their preparation employing the reaction between an acyloxysiloxane and a primary amine or secondary amine in the presence of an inert organic solvent. More particularly, it relates to the production of branched cyclic polysiloxanes having superior low temperature properties in addition to having desirable high temperature properties.

Organopolysiloxane fluids are known to possess desirable high temperature properties. Their use at relatively low temperatures has been limited, however, by their relatively high freezing points or crystallization temperatures and high viscosities at low temperatures. Attempts have been made in the prior art to improve the low temperature properties of organopolysiloxane fluids by introducing bulky groups or branches to the regular structure of the organopolysiloxane. This introduction of new groups is generally accomplished by copolymerization of monomer mixtures or equilibration techniques. The resulting branched organosiloxanes prepared by equilibration contain a random distribution of long and short branched chains. While these compounds have some improvement in the general low temperature properties, they still leave much to be desired in regard to such properties.

I have now found that branched cyclic polysiloxanes of specific desired composition having non-random, ordered structure can be prepared which have superior low temperature properties, such as lower pour points or freezing points and lower viscosities than prior art siloxanes of the same average molecular weight. Such materials also have high temperature properties which are equal to or better than those of prior art organosiloxanes of the same bulk viscosity. These novel branched cyclic organosiloxanes have the generic formula:

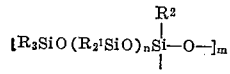

wherein R, R¹ and R² are monovalent hydrocarbyl radicals, m is an integer having a value of 3 to 5 inclusive and n is an integer having a value of 1 to 6 inclusive.

The monovalent hydrocarbyl radicals which are represented by R, R¹ and R² in the above formula are illustrated by alkyl groups, such as methyl, ethyl, propyl, isopropyl, butyl, isobutyl, amyl, hexyl and the like; alkenyl groups, such as vinyl, allyl and the like; alicyclic groups, such as cyclopentyl, cyclohexyl and the like; aryl groups, such as phenyl, naphthyl and the like; aralkyl groups, such as benzyl, phenylethyl and the like; and alkaryl groups, such as tolyl, ethyphenyl, xylyl, mesityl and the like. R, R¹ and R² can be the same or different radicals and R, R¹ and R² are preferably methyl radicals.

The branched cyclic polysiloxanes of the present invention can be obtained by a novel process. This process comprises reacting under substantially anhydrous conditions an acyloxy-siloxane having the formula:

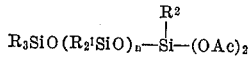

with an amine selected from the class consisting of primary amines and secondary amines in the presence of an inert organic solvent, wherein R, R¹, R² and n are defined above and Ac is an acyl radical. The primary amines which are useful in the above process are illustrated by methylamine, ethylamine, benzylamine, n-butylamine and the like. The secondary amines which are useful in the above process are illustrated by dimethylamine, diethylamine, di-isopropylamine, piperidine and the like. The acyl radicals which constitute Ac in the above formula are illustrated by acetyl, propionyl, butyryl, benzoyl and the like. The reactants can be reacted in a ratio of 1 mole of acyloxy-siloxane to 2 moles of amine. Preferably an excess of amine is employed. This reaction preferably is carried out in the presence of an inert organic solvent. Such solvent is present in an amount of about 25 to about 80 volume percent based on total volume of reactants plus solvent. Useful solvents are benzene, toluene, tetrahydrofuran, isopropyl ether and the like. The process conditions are not narrowly critical. The reaction can be carried out in the temperature range of about 0° C. to about 150° C. The preferred temperature range is from about 25° C. to about 100° C. The acyloxy-siloxane reactants in the above process are prepared by the well known reaction between $$R_3SiO(R_2{}^1SiO)_nH$$

and $R^2Si(OAc)_3$ wherein R, R¹, R² (n) and Ac are defined above.

The invention is described in further detail in the following examples. "Me" designates the methyl "CH₃" radical.

Example I

To a 500 ml., 3-necked flask equipped with a stirrer, thermometer and gas inlet tube was charged 150 g. of $Me_3SiO(Me_2SiO)_6Si(Me)(OOCCH_3)_2$. Methylamine diluted with nitrogent (1:2 volume basis) was slowly bubbled through the acyloxysiloxane fluid and the reaction temperature was maintained between 30–40° C. for about 3 hours. After this period of time the reaction temperature started to fall and the nitrogen dilution of the methylamine was discontinued. Undiluted methylamine was then passed through the reaction mixture for about 3.5 hours and the heat of reaction kept the flask contents at 30–40° C. The reaction was completed by adding 150 g. of tetrahydrofuran to the flask and passing methylamine through the flask contents for an additional 3.5 hours at ambient temperature. This entire reaction was carried out under substantially anhydrous conditions. The product was isolated by adding 150 g. of benzene, quenching the reaction mixture into excess water, separating and drying the siloxane layer over anhydrous calcium sulfate. Solvent was removed by heating to 200° C. at atmospheric pressure. The branched cyclic siloxane product was devolatilized by heating to 210° C./4 mm. Hg with a nitrogen sparge. There was thus obtained 112 g. (87 mole percent yield) of a clean, colorless, mobile siloxane fluid having density $d^{25}=0.9709$, refractive index $$n_D{}^{25}=1.4028$$

and molecular weight of 2281. This fluid consisted mostly of the branched cyclic tetramer,

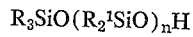

which has a calculated molar refraction ($MR_D$) of 567.4. Found: $MR_D=573.1$. Infrared spectroscopy analysis was in agreement with the product structure of

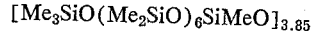

Example II

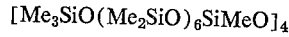 was reacted under substantially anhydrous conditions with excess methylamine in the presence of tetrahydrofuran solvent in a manner similar to that described above in Example I to produce a 67 mole percent yield of a colorless, mobile fluid having the properties of $n_D^{25}=1.4026$, $d^{25°}=0.9714$, molecular weight=1625. Calculations for $$[Me_3SiO(Me_2SiO)_3SiMeO]_{4.38}$$

indicated $MR_D=408.2$; found: $MR_D=407.8$. Infrared spectroscopy analysis was in agreement with the product structure of $[Me_3SiO(Me_2SiO)_3SiMeO]_4$.

The most important single property of branched cyclic siloxane polymers is their extremely low pour points or freezing points. This property appreciably extends the service temperature range of these materials. The pour points were obtained with a modified Beckman freezing point apparatus. The apparatus provided for liquid nitrogen as a coolant, a constant purge of argon over the sample, insertion of the thermocouple directly in the sample, and vigorous agitation of the sample by means of a hand operated wire stirrer. Pour points were determined on the fluids by continuously stirring the samples as they cooled and taking temperature versus time readings at 1-minute intervals. In the region of the pour point, 30-sec. intervals were employed. The plateau on the time-temperature plot was taken as the lower limit of the pour point. At this temperature the fluid could no longer be stirred. At least two cooling curves were run on each sample together with a melting curve determination to eliminate supercooling affects. The pour points of novel branched cyclic siloxane fluids and a prior art cyclic siloxane fluid which served as a control are given in the table below. Generally, the data shows that the pour points of the novel branched cyclic siloxanes are substantially lower than those of prior art cyclic dimethylsiloxane fluids.

TABLE.—POUR POINTS OF SILOXANE FLUIDS

| Structure | Pour Point, °F. | Viscosity Cstks., 25° C. |
|---|---|---|
| $(MD_3T)_4$ | −140 | 15.97 |
| $(MD_6T)_5$ | −140 | 25.73 |
| $(Me_2SiO)_4$ | *+63.5 | 2.4 |

$M=Me_3SiO_{1/2}$; $D=Me_2SiO$; $T=MeSiO_{3/2}$.
*=Value is melting point.

The novel branched cyclic siloxanes also have high temperature properties which are comparable to the properties of non-branched cyclic siloxanes in the same general viscosity range.

The novel branched cyclic organopolysiloxanes of the present invention can be used in any manner similar to prior organopolysiloxanes, such as in lubricating oils and electronic coolants and the like. In addition to such prior art utility, the present novel compositions have superior low temperature properties which greatly extends the utility of the fluids prepared therefrom to such low temperatures.

What is claimed is:

1. Branched cyclic organopolysiloxanes having non-random, ordered structure having the formula:

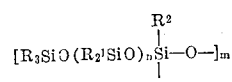

wherein R, R¹ and R² are monovalent hydrocarbyl radicals, $m$ is an integer having a value of 3 to 5 inclusive and $n$ is an integer having a value of 1 to 6 inclusive.

2. Branched cyclic organopolysiloxane having the formula:

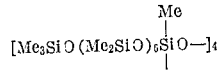

3. Branched cyclic organopolysiloxane having the formula:

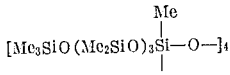

4. A process for the production of branched cyclic organopolysiloxanes having non-random, ordered structure which comprises reacting under substantially anhydrous conditions and in the presence of an inert organic solvent an acyloxy-siloxane having the formula:

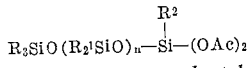

wherein R, R¹ and R² are monovalent hydrocarbyl radicals, $n$ is an integer having a value of 1 to 6 inclusive and Ac is an acyl radical with an amine selected from the class consisting of primary and secondary amines, said amine being present in an amount sufficient to provide at least two moles of amine per mole of acyloxy-siloxane.

5. A process for the production of branched cyclic organopolysiloxanes having non-random, ordered structure which comprises reacting under substantially anhydrous conditions an acyloxy-siloxane having the formula:

$$Me_3SiO(Me_2SiO)_6Si(Me)(OOCCH_3)_2$$

with at least two moles of methylamine per mole of acyloxysiloxane in the presence of tetrahydrofuran.

6. A process for the production of branched cyclic organopolysiloxanes having non-random, ordered structure which comprises reacting under substantially anhydrous conditions an acyloxy-siloxane having the formula:

$$Me_3SiO(Me_2SiO)_3Si(Me)(OOCCH_3)_2$$

with at least 2 moles of methylamine per mole of acyloxysiloxane in the presence of tetrahydrofuran.

References Cited by the Examiner
UNITED STATES PATENTS

| 2,486,162 | 10/1949 | Hyde | 260—448.2 |
| 2,623,832 | 12/1952 | MacKenzie et al. | 260—448.2 |
| 3,105,061 | 9/1963 | Bruner | 260—448.2 |

HELEN M. McCARTHY, *Acting Primary Examiner.*

SAMUEL H. BLECH, P. F. SHAVER,
*Assistant Examiners.*